Figure 2:
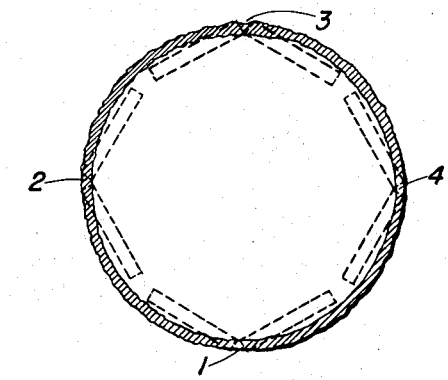

July 5, 1955     J. F. HOSLER ET AL     2,712,202

METHOD OF TREATING TREE DISEASES

Filed June 8, 1954     2 Sheets-Sheet 1

INVENTORS
JOHN F. HOSLER
ARMEN C. TARJAN
BY   FRANK L. HOWARD

ATTORNEY

United States Patent Office 2,712,202
Patented July 5, 1955

2,712,202
METHOD OF TREATING TREE DISEASES

John F. Hosler, Bound Brook, N. J., and Armen Charles Tarjan, Wakefield, and Frank L. Howard, Kingston, R. I., assignors to The Board of Trustees of the University of Rhode Island, Kingston, R. I.

Application June 8, 1954, Serial No. 435,213

6 Claims. (Cl. 47—57.5)

This invention relates to vascular wilt diseases of trees. More particularly it relates to chemical agents capable of controlling such diseases and the use thereof. Still more particularly, it relates to chemical agents specifically useful for controlling Dutch elm disease.

Vascular wilt diseases incited by different fungi, viruses and bacteria occur in many different species of trees. For instance, Phytophthora wilt and canker occur in rubber, Cinchona, avocado and cacoa trees. "Mal secco" occurs in lemon trees. Fire blight occurs in pear and pomaceous fruit trees. Dutch elm disease and phloem necrosis occur in elm trees. Oak wilt incited by *Chalara quercina* occurs in oak trees and Verticillium wilt occurs in maple and other hardwood trees. One of the most important wilt diseases of hardwoods presently found in the United States, however, is the Dutch elm disease.

While the new therapeutants of this invention are applicable for controlling various wilt diseases, the instant invention is primarily concerned with controlling the Dutch elm disease. Elm trees in the United States are important not only to the lumber industry, but also because of their value as decorative and shade trees. The relatively recent introduction into this country of the highly destructive Dutch elm disease, therefore, has created an extremely serious problem.

The Dutch elm disease is caused by the fungus *Ceratostomella ulmi* (*Graphium ulmi*), the only known carriers for which are the European (Scolytus) and the American (Hylurgopinus) bark beetles. These beetles introduce the fungus into the tree where it grows and interferes with the normal metabolism. Yellowing of the leaves and necrosis of terminal twigs follow shortly after the tree is initially infected.

Prior to this invention, there was no known cure for the Dutch elm disease. Once the fugus is introduced into a tree, it spreads rapidly to surrounding tissues and may result in death of the tree within a period generally not greater than three to four years. Various methods have been proposed for controlling the disease. The most practical has been sanitation. By this method diseased trees are singled out and completely destroyed, for instance, by burning. While this method is adequate in a limited area, it is both impractical and uneconomical for general control of the disease.

Another method involves the use of known insecticides in an effort to destroy the fungus-carrying beetle. Such chemicals as DDT and methoxy-chlor have been applied to trees by spraying. Again, while the method is to some extent effective, it is only practical for a small area and not for general control. The insecticides are hazardous and expensive and must be employed in large amounts.

Some experimentation has also been conducted with a view to finding a chemical agent useful in controlling the fungus. Benzoic acid, diaminoazobenzenes, hydroquinone, and other compounds of this class have been tried experimentally. Various mercaptoacetic acids and their derivatives have also been tried. A number of quinolinols have also been tested as described in Contributions from the Boyce-Thompson Institute, page 326, July–September 1951. In addition, certain inorganic salts such as potassium permanganate, zinc chloride and copper sulfate have been investigated. However, all of these, even those of known fungicidal and fungitoxic activity, have been ineffective in controlling the disease when spores of the pathogenic fungus are introduced into the sap stream. Some, such as copper sulfate and sodium 2-benzothiazolyloxy-acetate, are also very phytotoxic.

There has remained, therefore, an urgent need for successfully controlling the Dutch elm disease. It is the primary object of this invention to fulfill this need. In accordance with this invention it has now been found that compositions containing as the active ingredient at least one compound which in the form of the free acid has the formula

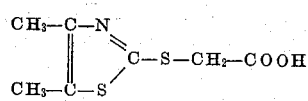

are extremely effective in controlling the Dutch elm disease.

Heretofore, attempts to control Dutch elm disease have been through efforts to kill the fugus. The compositions according to this invention, however, exhibit little if any fungicidal or fungitoxic activity. It is particularly surprising, therefore, that control of Dutch elm disease as described herein has proved so profoundly effective. This successful control is the more surprising since compounds closely related to the active ingredient of the compositions of this invention show little if any control of the disease. The mode of action by which these unexpected and highly successful results are obtained is not understood nor is it desired to limit this invention by any particular theory of operation.

It is a further advantage of this invention that the above described acid may be readily prepared by reacting chloroacetic acid with sodium 4,5-dimethyl-2-mercaptothiazole as reported in the Journal of the American Chemical Society 70, 2849–55 (1948). While the free acid, its esters and amides may be effectively employed, the preferred compounds are the ammonium and alkali and alkaline earth metal salts. The solubility of the salts is such as to obtain more readily the disease controlling effect in the treated tree. Moreover, the salts offer obvious economical advantages over the esters and amides, for which reason the sodium salt is particularly preferred.

The disease controlling agents of this invention may be used in various ways. Thus the chemical compound may be employed per se. Preferably, however, it is made into a composition using an inert carrier. Any suitable inert carrier may be employed, but, in general, it will usually be water. Concentration of the active ingredient in the composition is not critical. The important factor is the quantity of active ingredient taken up by the tree in relation to its total volume. However, there are practical limits of concentration determined by economic factors such as, for instance, time elapsed for application. The concentration will also vary with mode of application of the composition. For a foliage spray, for example, as little as 1 part in 5000 parts of water may be used. Since concentration is not important and the active ingredient shows no phytotoxic action, the pure compound may be used as in the borehole method described below. Obviously, the preferred amount of active ingredient relative to volume of tree is the minimum amount which gives maximum control.

The disease controlling agents according to this invention may be applied to trees in various ways. Thus, for instance, it may be applied in the form of a solution as a foliar spray. It may also be applied by permitting uptake of an aqueous solution slowly into the sap stream. Still another mode of application comprises mixing the agent in the soil surrounding a tree whereby it is slowly absorbed through the roots. This latter method, however, is extremely wasteful of chemical agent and less effective.

A preferred method which also constitutes an additional embodiment of this invention is the bore-hole method.

Figure 1:
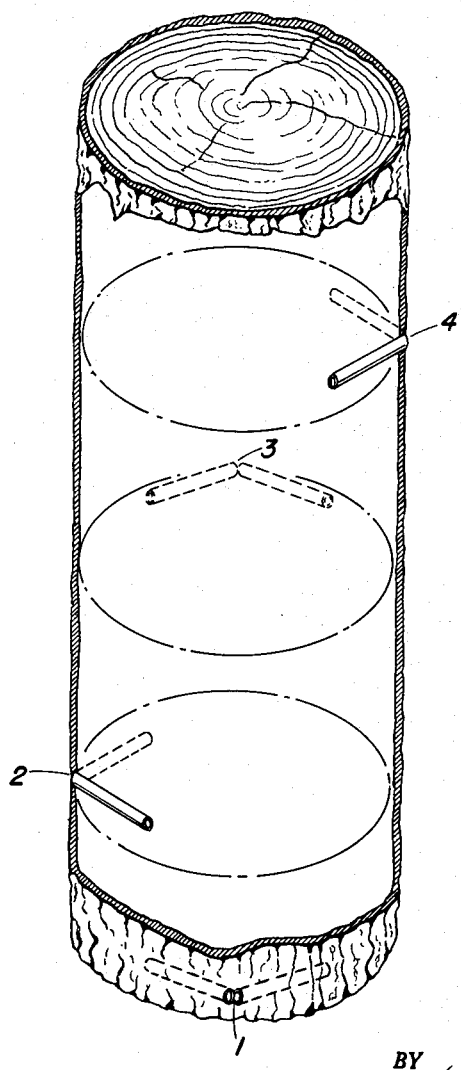

This method is illustrated in Figs. 1 and 2 of the drawing.

Figure 3:
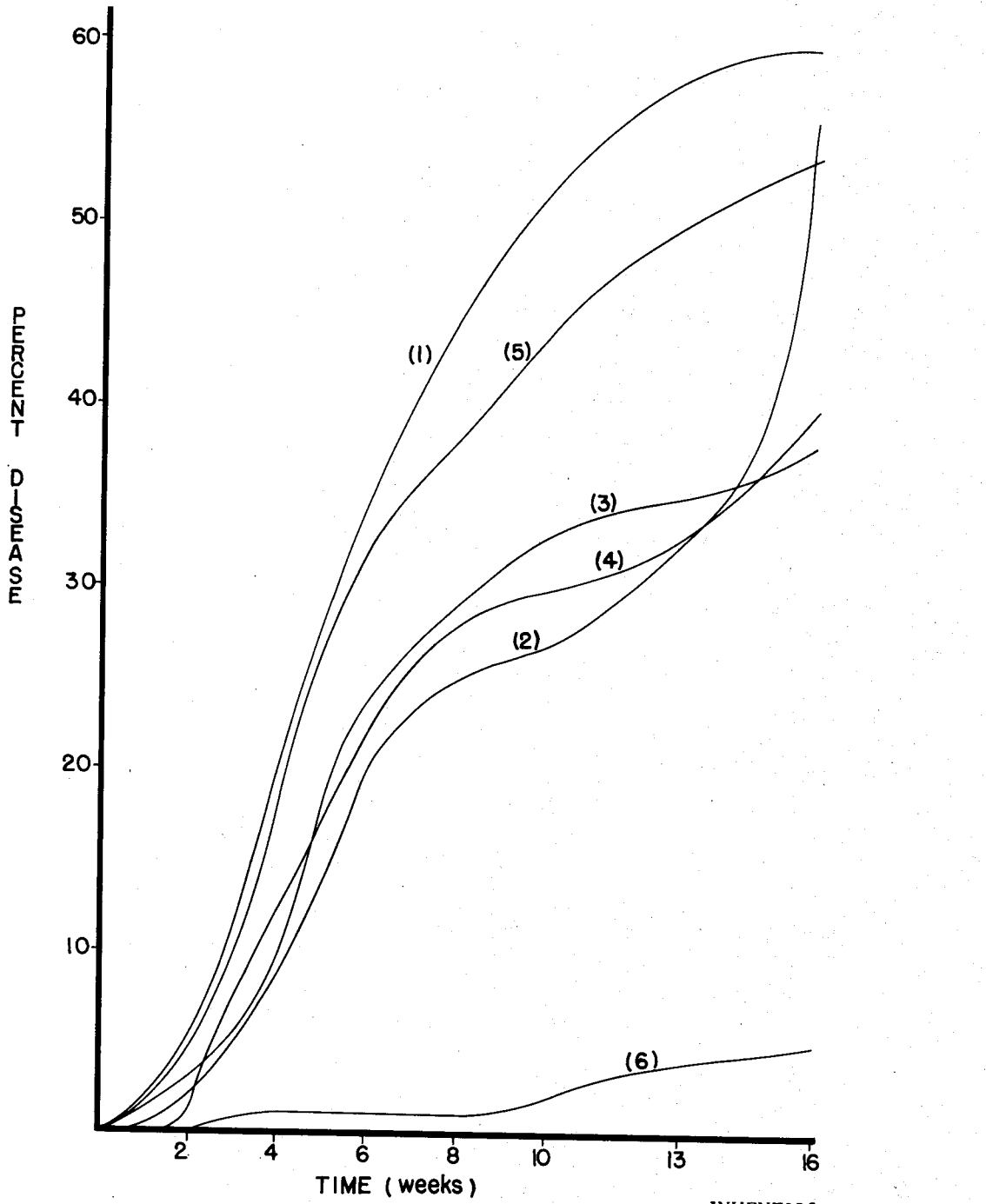

Fig. 3 shows curves representing the results of treatments described in this specification.

This method comprises boring holes tangentially into the sapwood of the trunk of a tree in an ascending spiral so that no one hole lies directly above or below another. Such a series of tangential bore holes may be started at any point on the tree, but preferably will be put in the trunk of the tree about three to five feet from the ground.

The number of holes as well as their diameter and depth will vary with the size of the tree. However, the actual number of bark penetrations need only be half this number since, as indicated by reference numerals 1–4 of Figs. 1 and 2, treatment holes may be bored in two directions from each bark penetration. For instance, with seedlings of approximately two to four inches in diameter breast high, about four to six holes will generally be sufficient. These holes will be about ¼ of an inch in diameter and up to two inches in depth. For trees of greater size, the number of holes as well as the diameters and depths thereof will naturally have to be larger to obtain the same effect.

The chemical agent, either per se, but more generally as a composition in the form of an aqueous paste, is then packed into these holes such as by ramming or by using a pressure gun. The filled holes are then corked so that the outer surface of the cork is flush with the tree and the corked surface covered with a protective grease. This particular manner of applying the control agent insures a direct and uniform availability thereof into the sap stream of the tree.

The following examples will further demonstrate the invention. These examples are illustrative only and are in no way intended to be limiting.

EXAMPLE 1

Thirty experimental trees were selected at random from a designated group of seven year old uniform seedlings of approximately 2–4 inches diameter breast high. Four ¼ inch holes about 1 inch in depth were then tangentially bored into the trunks of 25 of the trees in a descending spiral so that no one hole lay directly above or below another. Each of five chemical agents to be tested, including sodium 4,5-dimethyl-2-thiazolylmercaptoacetate of this invention, was packed into the holes of each of five trees located in one of five zones into which the group was divided, the holes corked flush with the trunks and a protective coating of grease applied thereover. This procedure was repeated in each of the other four zones so that there were five replicates to each treatment as well as the control blank.

Fourteen days later all the trees were inoculated with Dutch elm disease fungus by placing a drop of spore suspension containing approximately 200,000 spores of *Graphium ulmi* on immature, unsuberized bark in two different locations on each tree and inserting the point of a scalpel through the droplets into the xylem thereby severing the conductive tubes. This procedure of inoculation is suggested by G. A. Zentmeyer, Connecticut Agricultural Experiment Station Bulletin 498, 1946. It was found to be 97% effective in introducing disease into trees. Foliage was sprayed with a Malathion-DDT-casein spray for aphid and black caterpillar control immediately after inoculation, and every two weeks during the test with a DDT spray for elm leaf beetle and Japanese beetle control.

Data shown in Table I were obtained at periodic intervals, beginning two weeks after inoculation and continuing for 16 weeks on percent of each tree affected by yellowing and defoliation.

*Table I*

| No. | Treatment Agent | Percent Disease After— | | | | | | |
|---|---|---|---|---|---|---|---|---|
| | | 2 wks. | 4 wks. | 6 wks. | 8 wks. | 10 wks. | 13 wks. | 16 wks. |
| 1 | Blank | 5 | 20 | 35 | 45 | 52 | 58 | 60 |
| 2 | 4-methyl-2-thiazolyl-mercapto-acetic acid +NaHCO₃ (1:1). | 2 | 9 | 20 | 25 | 27 | 33 | 40 |
| 3 | 2-thiazolylmercapto-acetic acid+NaHCO₃ (1:1). | 3 | 10 | 24 | 29 | 33 | 35 | 38 |
| 4 | Sodium-2-thiazolylmer-capto-acetate. | 1 | 12 | 22 | 28 | 30 | 33 | 56 |
| 5 | Sodium -β-naphthoxy-acetate. | 4 | 18 | 32 | 38 | 44 | 50 | 54 |
| 6 | Sodium-4,5-dimethyl-2-thiazolylmercaptoace-tate.¹ | 0 | 1 | 1 | 1 | 2 | 4 | 5 |

The data in Table I and the curves of Fig. 3 of the drawing represent average readings for five replicate trees. It may be readily seen that the control trees as well as the trees treated with agents Nos. 2–5 showed a disease determination greater than 37% after 16 weeks in each case. On the other hand, substantially complete absence of disease symptoms, even after 16 weeks, was obtained using sodium 4,5-dimethyl-2-thiazolylmercaptoacetate of this invention.

EXAMPLE 2

In order to determine whether sodium-4,5-dimethyl-2-thiazolylmercaptoacetate of Example 1 was effective only as a disease symptom suppressant or whether it actually eradicated the fungus, wood samples were removed from the trees four months after the inoculation. Two samples were removed near the site of inoculation and one from the apical regions of each tree. These wood samples were rated as to the relative amount of vascular discoloration present and a representative chip from each plated aseptically on agar in order to determine the presence of the causal fungus. Results are summarized in Table II.

*Table II*

| Treatment | Replicate | Vascular Discoloration | | | Fungus | | |
|---|---|---|---|---|---|---|---|
| | | A | B | C | A | B | C |
| None | 1 | m | m | m | + | + | + |
| | 2 | m | m | m | + | + | + |
| | 3 | 0 | m | m | + | + | + |
| | 4 | m | m | m | + | + | + |
| | 5 | (¹) | (¹) | (¹) | (¹) | (¹) | (¹) |
| Sodium 4,5-dimethyl-2-thiazolylmercapto-acetate. | 1 | 0 | 0 | m | 0 | 0 | 0 |
| | 2 | 0 | 0 | 0 | + | + | + |
| | 3 | 0 | 0 | 0 | 0 | 0 | 0 |
| | 4 | 0 | 0 | t | 0 | 0 | + |
| | 5 | 0 | 0 | 0 | 0 | 0 | 0 |

0=absent;  +=present;  t=trace;  m=moderate.
¹ Tree killed by fungus.

Cambium discoloration was found to be present in each of untreated replicates but was substantially absent in trees treated according to this invention. The causal fungus was recovered from all samples taken from the untreated trees. In comparison, the presence of causal fungus was greatly reduced in the trees treated according to this invention. In two replicates there was even complete absence of fungus in all the test samples.

EXAMPLE 3

A six-inch diameter breast high American elm tree recently infected with Dutch elm disease as evidenced by the death of a few terminal twigs near the top and by the presence of the causal fungus in diseased wood, had an ascending spiral of eight holes bored in the trunk, each hole being about 6 inches in depth and three-eighths of an inch in diameter. These holes were then packed with a paste consisting of water and sodium-4,5-dimethyl-2-thiazolylmercaptoacetate. The tree was then kept under observation. It showed no additional symptoms of the disease and continued to grow in a normal manner for the remainder of the growing season.

We claim:

1. A method for protecting trees against vascular wilt diseases which comprises subjecting a tree to the action of at least one compound which in the form of the free acid has the formula

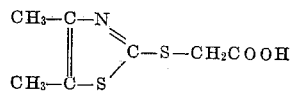

2. A method for protecting trees against vascular wilt diseases which comprises introducing into the sap stream of a tree at least one compound which in the form of the free acid has the formula

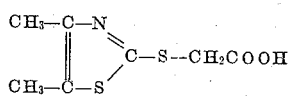

3. A method for protecting trees against vascular wilt diseases which comprises forming a series of tangential holes in the trunk of a tree, said tangential holes being arranged in an ascending spiral so that no one hole is directly above or below another, and packing said holes with an effective amount of at least one material which in the form of a free acid has the formula

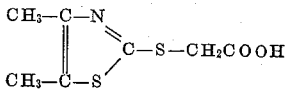

4. A method of protecting trees against Dutch elm disease which comprises subjecting a tree to the action of at least one compound the free acid of which has the formula

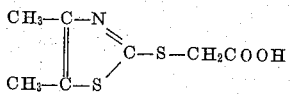

5. A method of protecting trees against Dutch elm disease which comprises introducing at least one compound the free acid of which has the formula

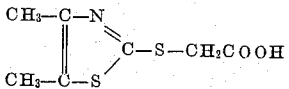

into a plurality of holes tangentially formed in the trunk of the tree, said holes being so arranged that no hole is directly above or below another.

6. A method according to claim 5 in which an aqueous paste of sodium-4,5-dimethyl-2-thiazolylmercaptoacetate is introduced into the holes.

References Cited in the file of this patent

UNITED STATES PATENTS 1,682,760    Laffin _____ Sept. 4, 1928

OTHER REFERENCES

Chemical Abstracts, vol. 43, column 3364-i. Published 1949.

"Die Innere Therapie der Pflanzen" (Muller), published by Paul Parey (Berlin, Germany) 1926. Pages 89, 90, 91.